United States Patent
Hunzinger et al.

(10) Patent No.: US 10,040,713 B2
(45) Date of Patent: Aug. 7, 2018

(54) GLASS FILM WITH SPECIALLY FORMED EDGE, METHOD FOR PRODUCING SAME, AND USE THEREOF

(71) Applicant: SCHOTT AG, Mainz (DE)

(72) Inventors: Bernhard Hunzinger, Wackernheim (DE); Doris Moseler, Budenheim (DE); Frank Buellesfeld, Kriftel (DE); Ulrich Lange, Mainz (DE)

(73) Assignee: SCHOTT AG, Mainz (DE)

( * ) Notice: Subject to any disclaimer, the term of this patent is extended or adjusted under 35 U.S.C. 154(b) by 109 days.

(21) Appl. No.: 14/974,296

(22) Filed: Dec. 18, 2015

(65) Prior Publication Data

US 2016/0176746 A1  Jun. 23, 2016

(30) Foreign Application Priority Data

Dec. 18, 2014 (DE) .......... 10 2014 119 064

(51) Int. Cl.
| | |
|---|---|
| *C03B 17/06* | (2006.01) |
| *C03B 33/02* | (2006.01) |
| *C03B 23/037* | (2006.01) |
| *C03B 18/04* | (2006.01) |
| *C03B 23/02* | (2006.01) |

(Continued)

(52) U.S. Cl.
CPC .......... *C03B 23/037* (2013.01); *C03B 17/065* (2013.01); *C03B 23/02* (2013.01); *C03B 33/0215* (2013.01); *C03C 3/091* (2013.01); *C03C 3/093* (2013.01);

(Continued)

(58) Field of Classification Search
CPC ... C03B 17/06–17/068; C03B 33/0207; C03B 33/0215; C03B 33/0222; C03B 23/02; C03B 23/037; B23K 26/0006; B23K 26/0054; B23K 26/0057; B23K 26/006; B23K 26/0063
See application file for complete search history.

(56) References Cited

U.S. PATENT DOCUMENTS

| | | |
|---|---|---|
| 5,609,284 A | 3/1997 | Kondratenko |
| 5,984,159 A | 11/1999 | Ostendarp et al. |

(Continued)

FOREIGN PATENT DOCUMENTS

| | | |
|---|---|---|
| DE | 69304194 T2 | 1/1997 |
| DE | 10128636 C1 | 8/2002 |

(Continued)

*Primary Examiner* — Lisa L Herring
(74) *Attorney, Agent, or Firm* — Ohlandt, Greeley, Ruggiero & Perle, L.L.P.

(57) ABSTRACT

A method for producing a glass film is provided. The method includes: heating a portion of a glass preform so that in the heated portion the glass has a viscosity of less than $10^9$ dPa·s, or drawing a glass from a melt; withdrawing the glass using a drawing device, wherein in case of drawing from a preform the drawn glass film is thinner than the glass preform; heating at least one point by means of a laser, the point being located in an edge region of the drawn glass film that is being formed by withdrawing the glass, wherein at the site of the laser focus the glass has a viscosity of not more than $10^9$ dPa·s before the laser is switched on and wherein heating is performed in such a manner that at least one notch is provided in parallel to the drawing direction.

18 Claims, 3 Drawing Sheets

(51) Int. Cl.
- *C03C 3/091* (2006.01)
- *C03C 3/093* (2006.01)
- *C03C 23/00* (2006.01)
- *C03B 33/09* (2006.01)
- *C03B 29/16* (2006.01)

(52) U.S. Cl.
CPC .......... *C03C 23/0025* (2013.01); *C03B 18/04* (2013.01); *C03B 29/16* (2013.01); *C03B 33/091* (2013.01)

(56) References Cited

U.S. PATENT DOCUMENTS

| | | | |
|---|---|---|---|
| 6,407,360 | B1 | 6/2002 | Choo et al. |
| 2010/0218557 | A1* | 9/2010 | Aniolek ................ C03B 17/067 65/97 |
| 2011/0014428 | A1* | 1/2011 | Nakamura ............ C03B 23/037 428/156 |
| 2011/0059296 | A1 | 3/2011 | Wada et al. |
| 2012/0070618 | A1 | 3/2012 | Sakamoto et al. |
| 2014/0093693 | A1* | 4/2014 | Zhang ................ B23K 26/0604 428/157 |
| 2014/0123703 | A1 | 5/2014 | LeBlanc et al. |
| 2014/0216108 | A1 | 8/2014 | Wiegel et al. |
| 2014/0357467 | A1 | 12/2014 | Buellesfeld et al. |
| 2015/0000830 | A1 | 1/2015 | Letz et al. |
| 2016/0102008 | A1* | 4/2016 | Abramov ................ C03B 33/09 65/97 |
| 2016/0121583 | A1* | 5/2016 | Edwards ............... H01L 51/524 428/215 |

FOREIGN PATENT DOCUMENTS

| | | | | |
|---|---|---|---|---|
| DE | 102008063554 | A1 | 6/2010 | |
| DE | 102011084128 | A1 | 4/2013 | |
| DE | 102009008292 | B4 | 9/2014 | |
| DE | 102013105734 | A1 | 12/2014 | |
| EP | 0872303 | B1 | 4/1998 | |
| JP | 2012519136 | A | 8/2012 | |
| WO | 2010099304 | A2 | 9/2010 | |
| WO | WO-2010099304 | A2 * | 9/2010 | ........... C03B 17/065 |

* cited by examiner

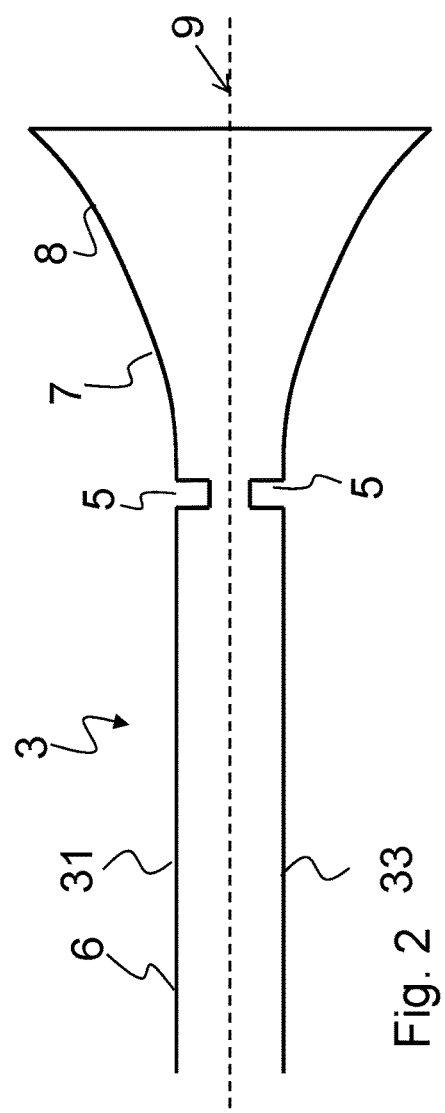
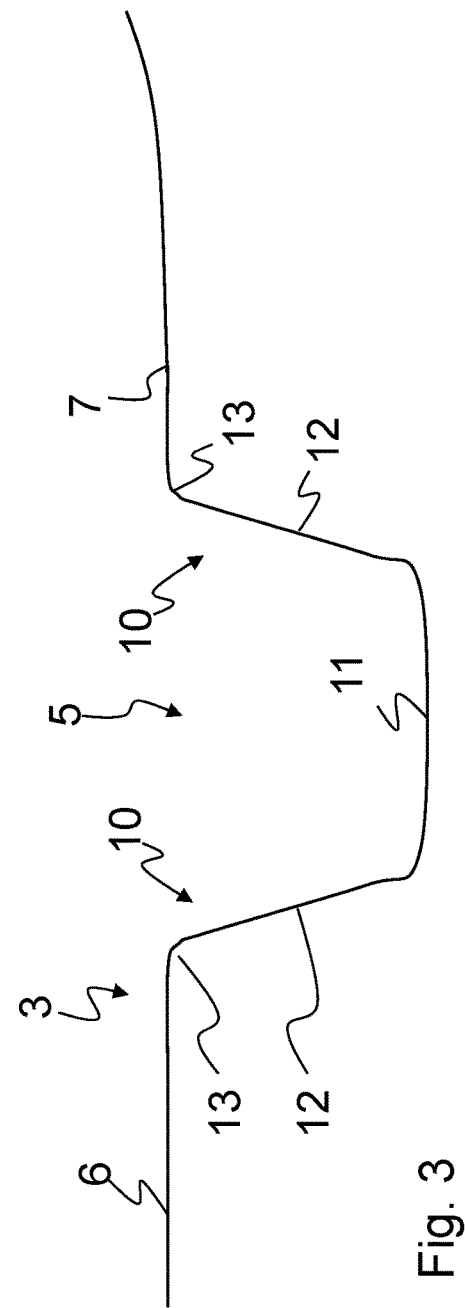
Fig. 2
Fig. 3

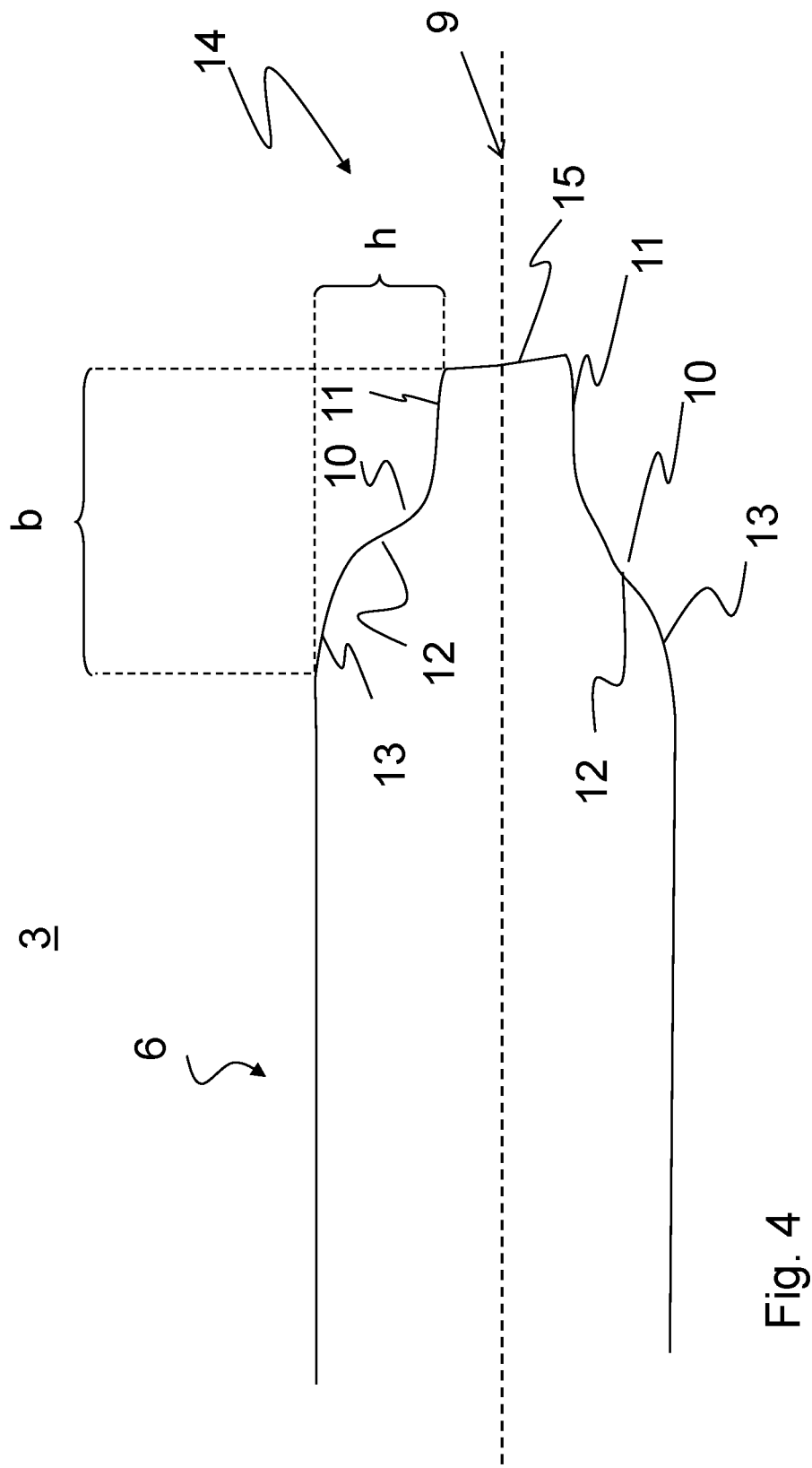

GLASS FILM WITH SPECIALLY FORMED EDGE, METHOD FOR PRODUCING SAME, AND USE THEREOF

CROSS REFERENCE TO RELATED APPLICATIONS

This application claims benefit under 35 U.S.C. § 119(a) of German Patent Application No. 102014119064.5 filed Dec. 18, 2014, the entire contents of which are incorporated herein by reference.

BACKGROUND OF THE INVENTION

1. Field of the Invention

The invention relates to a glass film with high edge strength, to a method for producing such a glass film, and to the use of a glass film exhibiting high edge strength.

2. Description of Related Art

Glass, especially thin glass, is increasingly employed in numerous application fields, such as consumer electronics. Due to the inherently very low thickness of a thin glass of less than 1 mm, preferably in a range from 5 µm to 250 µm, such glass has a number of advantages in terms of processing. For example, it is so flexible that it can be coiled and can thus be used in roll-to-roll processes that are preferred in the field of consumer electronics. Further advantages include the high chemical resistance of thin glass, its low density, low electrical and thermal conductivity, high temperature stability, and its optical transparency which allows processing by means of lasers, for example.

Although for the aforementioned reasons thin glass is an attractive material, it however exhibits the serious drawback of mechanical instability. This instability is in particular caused by the occurrence of microcracks at the edges of the glass, and such microcracks occur when the glass is cut to the desired size and in particular when severing the glass border that is produced during hot-forming in the drawing process usually employed for manufacturing thin glass.

Another way of producing thin glass is the so-called redrawing process which is particularly attractive for the production of small batches, special glasses, or special dimensions. In this case, a preformed glass body (preform) is heated, along a line, to temperatures at which it can be deformed, i.e. at which the glass has a viscosity of less than $10^9$ dPa·s, and the heated portion is withdrawn by a drawing mechanism. In this manner, a glass body is produced that is thinner and narrower than before, however, a planar quality portion and a thickened border are produced in this case as well. Thus, microcracks and defects which critically lower glass strength will naturally be induced in the edge region even in this case, when the border is severed.

Several methods have been used for improving edge strength. In case of greater thicknesses of the glass body, for example in the millimeter range, the edge may be further processed, e.g. by faceting, grinding, or polishing, but this is impossible for thin glass due to the small glass thickness thereof. Another way of edge finishing is to fill the microcracks by a coating. Moreover, special cutting methods such as by means of a laser are being discussed.

There are also discussions about the formation of a special high quality edge directly during the shaping process, for example during redrawing. For example, US 2011/0059296 A1 discloses a method for redrawing glass, in which a ribbon-shaped glass body with specially formed edge is obtained. The redrawing of the glass to obtain a narrow glass ribbon is performed in a manner so that a glass body is produced, which has rounded, i.e. convex, edges which are completely fire-polished and accordingly do not have microcracks. The method described in US 2011/0059296 A1 has a number of drawbacks.

For example, very special preforms have to be used to obtain a glass ribbon with a special edge shape. The preforms employed have widths of only 50 to 100 mm. Furthermore, it is advantageous for the method described therein, that the edges of the preform have already been processed, for example ground to take the form of a so-called C-cut so that the edges have a completely rounded C-shaped configuration. The ribbon-shaped glass body has a thickness of 100 µm and below, and the aspect ratio between width of the ribbon and thickness thereof is from 25 to 2000 is, so that ribbons with a maximum width of 200 mm can be obtained in this case.

US 2012/0070618 A1 discloses the use of such glass ribbons with rounded fire-polished edges as a sealing material.

Another method for producing a glass article with specially formed edge is disclosed in published patent application DE 10 2011 084 128 A1. Here, the special form of the edge of a thin glass sheet is achieved by introducing energy into the glass along the intended separation line using a laser beam, wherein prior to the severing the glass has a working temperature of at least more than 250 K below $T_g$, the transformation point of the glass. With this method described in DE 10 2011 084 128 A1, the edge of the thin glass obtained has fire-polished upper and lower surfaces. It is also possible to sever thickened edge portions, so-called borders, that are produced during the manufacturing process of the glass. However, formation of a bead is caused in this case, i.e. a thickening of the edges.

From DE 10 2009 008 292 B4 it is known to divide a thin glass into individual ribbons, by laser cutting. However, DE 10 2009 008 292 B4 does not include any statements about the edge quality or possible occurrence of separation beads.

Moreover, there are discussions in the prior art about so-called laser scribing. Here, the glass is first heated by irradiating the glass along a predetermined line by means of a laser beam, and then great mechanical stress is produced by immediately cooling the glass, so that the glass breaks easily along this line. Such a method is described in DE 693 04 194 T2, EP 0872 303 B1, and U.S. Pat. No. 6,407,360 B1, for example.

However, in the prior art lasers are not only used to produce edges of glass films and/or glass ribbons that are preferably free of cracks, but can also be used to selectively modify the thickness of a glass film or glass ribbon.

For example, from DE 101 28 636 C1 a method is known in which the glass thickness of a drawn or floated glass ribbon is influenced by local supply of heat by means of a laser. The method described in DE 101 28 636 C1 is in particular intended to equalize the glass thickness across the entire width, in particular it is intended to equalize, or avoid already during manufacturing, local thickness variations of the glass ribbon, e.g. fine corrugations (or so-called waviness) or warping. However, the edges quality of the obtained glass ribbon is not affected in this case.

DE 10 2008 063 554 A1 also describes a method for modifying the thickness of a flat glass, for example by means of a laser. Here, again, nothing is mentioned about the creation of a preferably microcrack-free surface of the edge.

US 2014/0123703 A1 describes a method for thickness control of a substrate, e.g. a glass substrate, which may take the form of a glass ribbon, inter alia. Again, the creation of a preferably microcrack-free surface is not mentioned.

According to the prior art it is thus possible to produce glass films or glass ribbons that exhibit high edge quality, for example by providing fire-polished surfaces, and it is possible to use lasers to selectively influence the thickness of a glass film or glass ribbon. However, for the case of specially shaped edges of a glass film or glass ribbon, complex processing steps are still necessary, such as the manufacturing of precise preforms, or separation beads are obtained.

Therefore, there is a need for an improved method for cost-efficiently producing large sheet-like glass articles or glass films that have a small thickness and improved edge shape, in particular without developing separation beads, in order to avoid microcracks and other glass defects in the edge region.

SUMMARY

The object of the invention is to provide a method for producing a glass film with specially formed edge, which mitigates the shortcomings of the prior art.

Another aspect of the invention relates to the provision of a glass film having a specially formed edge.

The object is achieved by a method for producing a glass film and by a glass film having a specially formed longitudinal edge as disclosed herein.

In the context of the present specification, glass film refers to a glass article that has an aspect ratio of width to thickness of the film of greater 100. The glass film obtained according to the invention has a width of at least 2 mm, preferably at least 20 mm, more preferably at least 200 mm, and has a thickness of less than 2000 µm, preferably less than 200 µm, more preferably less than 100 µm, and most preferably less than 50 µm. Most advantageously, the thickness is between 5 and 25 µm.

In the context of the present specification, longitudinal edges refer to the edges of the drawn glass film obtained in parallel to the drawing direction of the glass film.

The method for producing a glass film having a specially formed longitudinal edge comprises at least the steps of: heating a portion of a glass preform so that in the heated portion the glass has a viscosity of less than $10^9$ dPa·s, or drawing a glass from a melt; withdrawing the glass using a drawing device, wherein in case of drawing from a preform the drawn glass film is thinner than the glass preform; and heating at least one point by means of a laser, the point being located in an edge region of the drawn glass film that is being formed by withdrawing the glass, wherein at the site of the laser focus the glass has a viscosity of not more than $10^9$ dPa·s before the laser is switched on and wherein heating is performed in such a manner that at least one notch is provided in parallel to the drawing direction.

Since the temperatures on the surface of the glass film and in the interior volume thereof may differ, different viscosities may develop (when resolved) across the thickness of the glass film. In the context of the present invention, the viscosity given is always a value averaged over thickness, i.e. the given viscosity value is obtained as an average value across the thickness of the glass film at a particular location.

In one embodiment of the invention, the heating of the at least one point in the edge region of the glass film is performed so that the notch is formed on both sides, preferably even with mirror symmetry with respect to a mirror plane extending through the center of the glass film in parallel to the surfaces thereof.

In the context of the present specification, a notch is referred to as mirror-symmetrical if it is formed in both surfaces of the glass article and if width and depth values of the notches are obtained that do not differ by more than 10%. Thus, in the context of the present specification a notch is regarded as mirror-symmetrical even if the bottom or the walls of the notch have differing shapes.

In a further embodiment of the invention, the notch has a step-like shape. In the context of the present specification, a shape is referred to as being step-like if it is characterized by the presence of at least one shoulder, and at least one wall and one bottom, wherein shoulder refers to the area of the surface profile of the drawn glass film, which includes a transition from a higher region to a lower region of the glass film.

According to a further embodiment of the invention, it is possible to produce a plurality of notches in the glass film in such a manner that by singulating along the notches obtained according to the invention a plurality of small glass ribbons are obtained from the glass film, which have a specially formed stepped longitudinal edge.

According to a further embodiment of the invention, it is moreover possible to combine the creation of notches by means of at least one laser with a system for thickness modification as described, by way of example, in DE 101 28 636 C1.

According to another embodiment of the invention, the glass thickness of the glass film in the quality portion thereof is at least twice the glass thickness at the bottom of the notch. Quality portion refers to that region of the glass film in which the glass film has the desired glass thickness with a maximum deviation of ±20%.

Preferably, the thickness of the resultant glass film is less than or equal to 2000 µm, preferably less than 200 µm, more preferably less than 100 µm, and most preferably less than 50 µm. Most advantageously, the thickness is between 5 and 25 µm.

The notch preferably has an overall width of not more than 20 mm.

The power of the laser is preferably selected so that in the region heated by the at least one laser the viscosity of the glass is between $10^4$ and $10^9$ dPa·s, preferably between $10^5$ and $10^8$ dPa·s.

Laser power is between 5 and 100 W. Preferably, a $CO_2$ laser with a wavelength of 10.6 µm is used. The laser power may be introduced in pulsed form or continuously.

The glass that is employed is preferable a silicate glass, for example an alkali silicate glass, an alkali alkaline earth silicate glass, a soda-lime glass, a mixed-alkali lime silicate glass, a boron silicate glass, a phosphate silicate glass, a boron phosphate silicate glass, an aluminum silicate glass, an alkali aluminum silicate glass, an alkali alkaline earth aluminum silicate glass, a boron aluminum silicate glass, or a boron phosphate aluminum silicate glass.

According to one embodiment, the thin glass is a lithium aluminosilicate glass comprising the following composition (in wt %):

| Composition | (wt %) |
| --- | --- |
| $SiO_2$ | 55-69 |
| $Al_2O_3$ | 18-25 |
| $Li_2O$ | 3-5 |
| $Na_2O + K_2O$ | 0-30 |
| $MgO + CaO + SrO + BaO$ | 0-5 |
| $ZnO$ | 0-4 |
| $TiO_2$ | 0-5 |
| $ZrO_2$ | 0-5 |
| $TiO_2 + ZrO_2 + SnO_2$ | 2-6 |
| $P_2O_5$ | 0-8 |

| Composition | (wt %) |
|---|---|
| F | 0-1 |
| $B_2O_3$ | 0-2 |

Optionally, coloring oxides may be added, such as $Nd_2O_3$, $Fe_2O_3$, CoO, NiO, $V_2O_5$, $MnO_2$, $TiO_2$, CuO, $CeO_2$, $Cr_2O_3$, from 0 to 2 wt % of $As_2O_3$, $Sb_2O_3$, $SnO_2$, $SO_3$, Cl, F, and/or $CeO_2$ may be added as a refining agent, and from 0 to 5 wt % of rare earth oxides may further be added to impart magnetic, photonic or optical functions to the glass layer or glass sheet, and the total amount of the total composition is 100 wt %.

Preferably, the lithium aluminosilicate glass of the invention has the following composition (in wt %):

| Composition | (wt %) |
|---|---|
| $SiO_2$ | 57-66 |
| $Al_2O_3$ | 18-23 |
| $Li_2O$ | 3-5 |
| $Na_2O + K_2O$ | 3-25 |
| $MgO + CaO + SrO + BaO$ | 1-4 |
| ZnO | 0-4 |
| $TiO_2$ | 0-4 |
| $ZrO_2$ | 0-5 |
| $TiO_2 + ZrO_2 + SnO_2$ | 2-6 |
| $P_2O_5$ | 0-7 |
| F | 0-1 |
| $B_2O_3$ | 0-2 |

Optionally, coloring oxides may be added, such as $Nd_2O_3$, $Fe_2O_3$, CoO, NiO, $V_2O_5$, $MnO_2$, $TiO_2$, CuO, $CeO_2$, $Cr_2O_3$, from 0 to 2 wt % of $As_2O_3$, $Sb_2O_3$, $SnO_2$, $SO_3$, Cl, F, and/or $CeO_2$ may be added as a refining agent, and from 0 to 5 wt % of rare earth oxides may further be added to impart magnetic, photonic or optical functions to the glass layer or glass sheet, and the total amount of the total composition is 100 wt %.

Most preferably, the lithium aluminosilicate glass of the invention has the following composition (in wt %):

| Composition | (wt %) |
|---|---|
| $SiO_2$ | 57-63 |
| $Al_2O_3$ | 18-22 |
| $Li_2O$ | 3.5-5 |
| $Na_2O + K_2O$ | 5-20 |
| $MgO + CaO + SrO + BaO$ | 0-5 |
| ZnO | 0-3 |
| $TiO_2$ | 0-3 |
| $ZrO_2$ | 0-5 |
| $TiO_2 + ZrO_2 + SnO_2$ | 2-5 |
| $P_2O_5$ | 0-5 |
| F | 0-1 |
| $B_2O_3$ | 0-2 |

Optionally, coloring oxides may be added, such as $Nd_2O_3$, $Fe_2O_3$, CoO, NiO, $V_2O_5$, $MnO_2$, $TiO_2$, CuO, $CeO_2$, $Cr_2O_3$, from 0 to 2 wt % of $As_2O_3$, $Sb_2O_3$, $SnO_2$, $SO_3$, Cl, F, and/or $CeO_2$ may be added as a refining agent, and from 0 to 5 wt % of rare earth oxides may further be added to impart magnetic, photonic or optical functions to the glass layer or glass sheet, and the total amount of the total composition is 100 wt %.

According to one embodiment of the invention, the thin glass is a soda-lime glass, comprising the following composition (in wt %):

| Composition | (wt %) |
|---|---|
| $SiO_2$ | 40-81 |
| $Al_2O_3$ | 0-6 |
| $B_2O_3$ | 0-5 |
| $Li_2O + Na_2O + K_2O$ | 5-30 |
| $MgO + CaO + SrO + BaO + ZnO$ | 5-30 |
| $TiO_2 + ZrO_2$ | 0-7 |
| $P_2O_5$ | 0-2 |

Optionally, coloring oxides may be added, such as $Nd_2O_3$, $Fe_2O_3$, CoO, NiO, $V_2O_5$, $MnO_2$, $TiO_2$, CuO, $CeO_2$, $Cr_2O_3$, from 0 to 2 wt % of $As_2O_3$, $Sb_2O_3$, $SnO_2$, $SO_3$, Cl, F, and/or $CeO_2$ may be added as a refining agent, and from 0 to 5 wt % of rare earth oxides may further be added to impart magnetic, photonic or optical functions to the glass layer or glass sheet, and the total amount of the total composition is 100 wt %.

Preferably, the soda-lime glass of the present invention has the following composition (in wt %):

| Composition | (wt %) |
|---|---|
| $SiO_2$ | 50-81 |
| $Al_2O_3$ | 0-5 |
| $B_2O_3$ | 0-5 |
| $Li_2O + Na_2O + K_2O$ | 5-28 |
| $MgO + CaO + SrO + BaO + ZnO$ | 5-25 |
| $TiO_2 + ZrO_2$ | 0-6 |
| $P_2O_5$ | 0-2 |

Optionally, coloring oxides may be added, such as $Nd_2O_3$, $Fe_2O_3$, CoO, NiO, $V_2O_5$, $MnO_2$, $TiO_2$, CuO, $CeO_2$, $Cr_2O_3$, from 0 to 2 wt % of $As_2O_3$, $Sb_2O_3$, $SnO_2$, $SO_3$, Cl, F, and/or $CeO_2$ may be added as a refining agent, and from 0 to 5 wt % of rare earth oxides may further be added to impart magnetic, photonic or optical functions to the glass layer or glass sheet, and the total amount of the total composition is 100 wt %.

Most preferably, the soda-lime glass of the present invention has the following composition (in wt %):

| Composition | (wt %) |
|---|---|
| $SiO_2$ | 55-76 |
| $Al_2O_3$ | 0-5 |
| $B_2O_3$ | 0-5 |
| $Li_2O + Na_2O + K_2O$ | 5-25 |
| $MgO + CaO + SrO + BaO + ZnO$ | 5-20 |
| $TiO_2 + ZrO_2$ | 0-5 |
| $P_2O_5$ | 0-2 |

Optionally, coloring oxides may be added, such as $Nd_2O_3$, $Fe_2O_3$, CoO, NiO, $V_2O_5$, $MnO_2$, $TiO_2$, CuO, $CeO_2$, $Cr_2O_3$, from 0 to 2 wt % of $As_2O_3$, $Sb_2O_3$, $SnO_2$, $SO_3$, Cl, F, and/or $CeO_2$ may be added as a refining agent, and from 0 to 5 wt % of rare earth oxides may further be added to impart magnetic, photonic or optical functions to the glass layer or glass sheet, and the total amount of the total composition is 100 wt %.

According to one embodiment, the thin glass is a borosilicate glass of the following composition (in wt %):

| Composition | (wt %) |
|---|---|
| $SiO_2$ | 60-85 |
| $Al_2O_3$ | 0-10 |
| $B_2O_3$ | 5-20 |
| $Li_2O + Na_2O + K_2O$ | 2-16 |
| $MgO + CaO + SrO + BaO + ZnO$ | 0-15 |
| $TiO_2 + ZrO_2$ | 0-5 |
| $P_2O_5$ | 0-2 |

Optionally, coloring oxides may be added, such as $Nd_2O_3$, $Fe_2O_3$, $CoO$, $NiO$, $V_2O_5$, $MnO_2$, $TiO_2$, $CuO$, $CeO_2$, $Cr_2O_3$, from 0 to 2 wt % of $As_2O_3$, $Sb_2O_3$, $SnO_2$, $SO_3$, Cl, F, and/or $CeO_2$ may be added as a refining agent, and from 0 to 5 wt % of rare earth oxides may further be added to impart magnetic, photonic or optical functions to the glass layer or glass sheet, and the total amount of the total composition is 100 wt %.

More preferably, the borosilicate glass of the present invention has the following composition (in wt %):

| Composition | (wt %) |
|---|---|
| $SiO_2$ | 63-84 |
| $Al_2O_3$ | 0-8 |
| $B_2O_3$ | 5-18 |
| $Li_2O + Na_2O + K_2O$ | 3-14 |
| $MgO + CaO + SrO + BaO + ZnO$ | 0-12 |
| $TiO_2 + ZrO_2$ | 0-4 |
| $P_2O_5$ | 0-2 |

Optionally, coloring oxides may be added, such as $Nd_2O_3$, $Fe_2O_3$, $CoO$, $NiO$, $V_2O_5$, $MnO_2$, $TiO_2$, $CuO$, $CeO_2$, $Cr_2O_3$, from 0 to 2 wt % of $As_2O_3$, $Sb_2O_3$, $SnO_2$, $SO_3$, Cl, F, and/or $CeO_2$ may be added as a refining agent, and from 0 to 5 wt % of rare earth oxides may further be added to impart magnetic, photonic or optical functions to the glass layer or glass sheet, and the total amount of the total composition is 100 wt %.

Most preferably, the borosilicate glass has the following composition (in wt %):

| Composition | (wt %) |
|---|---|
| $SiO_2$ | 63-83 |
| $Al_2O_3$ | 0-7 |
| $B_2O_3$ | 5-18 |
| $Li_2O + Na_2O + K_2O$ | 4-14 |
| $MgO + CaO + SrO + BaO + ZnO$ | 0-10 |
| $TiO_2 + ZrO_2$ | 0-3 |
| $P_2O_5$ | 0-2 |

Optionally, coloring oxides may be added, such as $Nd_2O_3$, $Fe_2O_3$, $CoO$, $NiO$, $V_2O_5$, $MnO_2$, $TiO_2$, $CuO$, $CeO_2$, $Cr_2O_3$, from 0 to 2 wt % of $As_2O_3$, $Sb_2O_3$, $SnO_2$, $SO_3$, Cl, F, and/or $CeO_2$ may be added as a refining agent, and from 0 to 5 wt % of rare earth oxides may further be added to impart magnetic, photonic or optical functions to the glass layer or glass sheet, and the total amount of the total composition is 100 wt %.

According to one embodiment of the invention, the thin glass is an alkali metal aluminosilicate glass of the following composition (in wt %):

| Composition | (wt %) |
|---|---|
| $SiO_2$ | 40-75 |
| $Al_2O_3$ | 10-30 |
| $B_2O_3$ | 0-20 |
| $Li_2O + Na_2O + K_2O$ | 4-30 |
| $MgO + CaO + SrO + BaO + ZnO$ | 0-15 |
| $TiO_2 + ZrO_2$ | 0-15 |
| $P_2O_5$ | 0-10 |

Optionally, coloring oxides may be added, such as $Nd_2O_3$, $Fe_2O_3$, $CoO$, $NiO$, $V_2O_5$, $MnO_2$, $TiO_2$, $CuO$, $CeO_2$, $Cr_2O_3$, from 0 to 2 wt % of $As_2O_3$, $Sb_2O_3$, $SnO_2$, $SO_3$, Cl, F, and/or $CeO_2$ may be added as a refining agent, and from 0 to 5 wt % of rare earth oxides may further be added to impart magnetic, photonic or optical functions to the glass layer or glass sheet, and the total amount of the total composition is 100 wt %.

More preferably, the alkali metal aluminosilicate glass of the present invention has the following composition (in wt %):

| Composition | (wt %) |
|---|---|
| $SiO_2$ | 50-70 |
| $Al_2O_3$ | 10-27 |
| $B_2O_3$ | 0-18 |
| $Li_2O + Na_2O + K_2O$ | 5-28 |
| $MgO + CaO + SrO + BaO + ZnO$ | 0-13 |
| $TiO_2 + ZrO_2$ | 0-13 |
| $P_2O_5$ | 0-9 |

Optionally, coloring oxides may be added, such as $Nd_2O_3$, $Fe_2O_3$, $CoO$, $NiO$, $V_2O_5$, $MnO_2$, $TiO_2$, $CuO$, $CeO_2$, $Cr_2O_3$, from 0 to 2 wt % of $As_2O_3$, $Sb_2O_3$, $SnO_2$, $SO_3$, Cl, F, and/or $CeO_2$ may be added as a refining agent, and from 0 to 5 wt % of rare earth oxides may further be added to impart magnetic, photonic or optical functions to the glass layer or glass sheet, and the total amount of the total composition is 100 wt %.

Most preferably, the alkali aluminosilicate glass of the present invention has the following composition (in wt %):

| Composition | (wt %) |
|---|---|
| $SiO_2$ | 55-68 |
| $Al_2O_3$ | 10-27 |
| $B_2O_3$ | 0-15 |
| $Li_2O + Na_2O + K_2O$ | 4-27 |
| $MgO + CaO + SrO + BaO + ZnO$ | 0-12 |
| $TiO_2 + ZrO_2$ | 0-10 |
| $P_2O_5$ | 0-8 |

Optionally, coloring oxides may be added, such as $Nd_2O_3$, $Fe_2O_3$, $CoO$, $NiO$, $V_2O_5$, $MnO_2$, $TiO_2$, $CuO$, $CeO_2$, $Cr_2O_3$, from 0 to 2 wt % of $As_2O_3$, $Sb_2O_3$, $SnO_2$, $SO_3$, Cl, F, and/or $CeO_2$ may be added as a refining agent, and from 0 to 5 wt % of rare earth oxides may further be added to impart magnetic, photonic or optical functions to the glass layer or glass sheet, and the total amount of the total composition is 100 wt %.

In one embodiment, the thin glass is an aluminosilicate glass having a low alkali content, with the following composition (in wt %):

| Composition | (wt %) |
|---|---|
| $SiO_2$ | 50-75 |
| $Al_2O_3$ | 7-25 |
| $B_2O_3$ | 0-20 |
| $Li_2O + Na_2O + K_2O$ | 0-4 |
| $MgO + CaO + SrO + BaO + ZnO$ | 5-25 |
| $TiO_2 + ZrO_2$ | 0-10 |
| $P_2O_5$ | 0-5 |

Optionally, coloring oxides may be added, such as $Nd_2O_3$, $Fe_2O_3$, CoO, NiO, $V_2O_5$, $MnO_2$, $TiO_2$, CuO, $CeO_2$, $Cr_2O_3$, from 0 to 2 wt % of $As_2O_3$, $Sb_2O_3$, $SnO_2$, $SO_3$, Cl, F, and/or $CeO_2$ may be added as a refining agent, and from 0 to 5 wt % of rare earth oxides may further be added to impart magnetic, photonic or optical functions to the glass layer or glass sheet, and the total amount of the total composition is 100 wt %.

More preferably, the aluminosilicate glass of low alkali content according to the present invention has the following composition (in wt %):

| Composition | (wt %) |
|---|---|
| $SiO_2$ | 52-73 |
| $Al_2O_3$ | 7-23 |
| $B_2O_3$ | 0-18 |
| $Li_2O + Na_2O + K_2O$ | 0-4 |
| $MgO + CaO + SrO + BaO + ZnO$ | 5-23 |
| $TiO_2 + ZrO_2$ | 0-10 |
| $P_2O_5$ | 0-5 |

Optionally, coloring oxides may be added, such as $Nd_2O_3$, $Fe_2O_3$, CoO, NiO, $V_2O_5$, $MnO_2$, $TiO_2$, CuO, $CeO_2$, $Cr_2O_3$, from 0 to 2 wt % of $As_2O_3$, $Sb_2O_3$, $SnO_2$, $SO_3$, Cl, F, and/or $CeO_2$ may be added as a refining agent, and from 0 to 5 wt % of rare earth oxides may further be added to impart magnetic, photonic or optical functions to the glass layer or glass sheet, and the total amount of the total composition is 100 wt %.

Most preferably, the aluminosilicate glass of low alkali content according to the present invention has the following composition (in wt %):

| Composition | (wt %) |
|---|---|
| $SiO_2$ | 53-71 |
| $Al_2O_3$ | 7-22 |
| $B_2O_3$ | 0-18 |
| $Li_2O + Na_2O + K_2O$ | 0-4 |
| $MgO + CaO + SrO + BaO + ZnO$ | 5-22 |
| $TiO_2 + ZrO_2$ | 0-8 |
| $P_2O_5$ | 0-5 |

Optionally, coloring oxides may be added, such as $Nd_2O_3$, $Fe_2O_3$, CoO, NiO, $V_2O_5$, $MnO_2$, $TiO_2$, CuO, $CeO_2$, $Cr_2O_3$, from 0 to 2 wt % of $As_2O_3$, $Sb_2O_3$, $SnO_2$, $SO_3$, Cl, F, and/or $CeO_2$ may be added as a refining agent, and from 0 to 5 wt % of rare earth oxides may further be added to impart magnetic, photonic or optical functions to the glass layer or glass sheet, and the total amount of the total composition is 100 wt %.

Table 1 shows several typical embodiments of thin alkali-containing glasses which are intended to be chemically tempered.

TABLE 1

Embodiments of alkali-containing borosilicate glasses

| Composition (wt %) | Example 1 | Example 2 | Example 3 | Example 4 | Example 5 | Example 6 | Example 7 | Example 8 |
|---|---|---|---|---|---|---|---|---|
| $SiO_2$ | 80 | 64 | 70 | 61 | 68 | 70 | 67 | 60 |
| $Al_2O_3$ | 3 | 7 | 1 | 18 | 9 | 8 | 6 | 7 |
| $Li_2O$ | 0 | 0 | 0 | 5 | 0 | 0 | 0 | 0 |
| $Na_2O$ | 5 | 6 | 8 | 10 | 5 | 3 | 5 | 8 |
| $K_2O$ | 0 | 6 | 8 | 1 | 2 | 6 | 4 | 5 |
| CaO | 0 | 0 | 7 | 1 | 2 | 0 | 0 | 0 |
| BaO | 0 | 0 | 2.5 | 0 | 2 | 0 | 0 | 0 |
| ZnO | 0 | 5 | 2.4 | 0 | 0 | 1 | 2 | 0 |
| $ZrO_2$ | 0 | 0 | 0 | 3 | 3 | 0 | 0 | 0 |
| $B_2O_3$ | 12 | 8 | 0.1 | 1 | 8 | 12 | 16 | 20 |
| $TiO_2$ | 0 | 4 | 1 | 0 | 0 | 0 | 0 | 0 |

$SiO_2$, $B_2O_3$, and $P_2O_5$ act as glass network formers. Their content should not be less than 40% for conventional methods, otherwise the glass plate or glass sheet cannot be formed and would become brittle and lose transparency. The higher the $SiO_2$ content the higher melting and processing temperatures are requires during glass production, and therefore this content should normally be less than 90%. An addition of $B_2O_3$ and $P_2O_5$ to $SiO_2$ may modify the network properties and lower the melting and processing temperatures of the glass. Also, the glass network formers have a strong impact on the coefficient of thermal expansion (CTE) of the glass.

Furthermore, the $B_2O_3$ in the glass network may form two different polyhedral structures that can be better adapted to the loading force from outside. An addition of $B_2O_3$ generally results in lower thermal expansion and a lower Young's modulus, which in turn leads to good thermal shock resistance and slower chemical tempering. Therefore, the addition of $B_2O_3$ to ultrathin glass may largely improve chemical tempering, and thin glass chemically tempered in this way can be used for practical applications on a larger scale.

$Al_2O_3$ acts as a glass network former and also as a glass network modifier. $[AlO_4]$ tetrahedron and $[AlO_6]$ hexahedron are formed in the glass network depending on the amount of $Al_2O_3$. They are able to adjust the ion exchange rate by modifying the amount of space for ion exchange within the glass network. In case of an excessive amount of $Al_2O_3$, for example of greater than 40%, melting temperature and processing temperature of the glass become much higher and the glass tends to crystallize, what causes the glass to loose transparency and flexibility.

Alkali metal oxides such as $K_2O$, $Na_2O$, and $Li_2O$ function as glass processing modifiers and may destroy the glass network by forming non-bridging oxides within the glass network. An addition of alkali metals may reduce the processing temperature of the glass and increase the CTE of the glass. The presence of Na and Li is essential for ultrathin flexible glass that is to be chemically tempered, the ion exchange of $Na^+/Li^+$, $Na^+/K^+$, and $Li^+/K^+$ is a necessary step for tempering. The glass will not be toughened when it does not contain alkali metals itself. However, the total amount of alkali metals should not be greater than 30%, otherwise the glass network is completely destroyed without forming a glass. Another important factor is that thin glass should have a low CTE, and then the glass should not contain an excessive amount of alkali metals in order to meet this requirement.

Alkaline earth elements such as MgO, CaO, SrO, and BaO function as network modifiers and are capable of lowering the formation temperature of the glass. These elements may alter the CTE and Young's modulus of the glass, and the alkaline earth elements have a very important function for modifying the refractive index of the glass to meet special requirements. For example, MgO is able to lower the refractive index of glass, while BaO is able to increase the refractive index. The amount of alkaline earth elements in the manufacturing of glass should not be greater than 40%.

Some transition metal elements in the glass, such as ZnO and $ZrO_2$, have a function similar to that of the alkaline earth elements. Other transition metal elements, such as $Nd_2O_3$, $Fe_2O_3$, CoO, NiO, $V_2O_5$, $MnO_2$, $TiO_2$, CuO, $CeO_2$, and $Cr_2O_3$, function as coloring agents, so that the glass includes special photons or exhibits optical functions, e.g. color filter function or light conversion.

Once cooled, the drawn glass film is preferably separated along the obtained notch so that the special shape of the resulting edge of the glass film is produced. The edges of the quality portion of the glass film so obtained are referred to as longitudinal edges in the context of the invention. The longitudinal edges are obtained in parallel to the drawing direction of the drawn glass film.

The separation of the glass film along the notch may be accomplished by breaking, but also by a cutting process, in particular mechanical cutting, but also by thermal cutting, laser cutting, laser scribing, or water-jet cutting, or by hole drilling using an ultrasonic drill, sand blasting, chemical etching of the edge or the surface, or by combinations thereof.

If the glass film is produced from a melt, any common hot-forming process may be employed for this purpose. In particular, the glass film may be obtained in a down-draw, overflow fusion, or float process.

If the inventive glass film with specially formed longitudinal edges is not obtained by drawing from a melt but by redrawing from a preform, the edges of the preform are produced in a down-draw, overflow fusion, float, or redrawing process, or by a cutting process, in particular mechanical cutting, thermal cutting, laser cutting, laser scribing, or water-jet cutting, or by hole drilling using an ultrasonic drill, sand blasting, chemical etching of the edge or the surface, or by combinations thereof.

The glass film obtained by the method according to the invention has a stepped longitudinal edge, and in one embodiment of the invention the longitudinal edge is stepped on both sides, on the upper surface and the lower surface, preferably even in a manner so that a double step in the sense of the present application is obtained that has a mirror-symmetrical shape with respect to a mirror plane extending through the center of the glass film in parallel to the surfaces thereof.

In the context of this specification, mirror-symmetrical shape of a double step means that the two steps arranged above and below the mirror plane have a step height and curvature radii that do not deviate from one another by more than 10%.

According to a further embodiment of the invention, the step has a concave curvature at the transition between the wall region and the bottom.

Preferably, the following applies to the radius of curvature r of this concave curvature: $r \geq 2.5$ μm.

According to a further embodiment of the invention, the step has a convex curvature at the transition from the quality portion of the drawn glass film to the wall region.

Preferably, the following applies to the radius of this convex curvature: $r \geq 2.5$ μm.

The surfaces of the longitudinal edge are of fire-polished quality until the actual fracture line of the drawn glass film. Sharp edges are only obtained in the region of the actual fracture line. Due to the special surface profile of the glass film in the region of the longitudinal edge, however, these sharp edges are of little relevance for the bending strength of the drawn glass film, because the edges are near the center of the glass film, so that tensile stresses occurring upon bending of the glass film will be significantly lower here than on the faces of the glass film. Therefore, a particularly robust thin glass film, in terms of bending stress, is obtained in this way.

The invention further relates to a glass film which is in particular produced by reheating and drawing from a preform or by drawing a glass film from a melt, and by separating the borders, wherein the longitudinal edges are step-shaped, wherein a height h of the step is less than the thickness of the glass film, and wherein adjacent to the longitudinal edge toward the center of the glass film there is a transition region in which thickness increases, wherein this transition region has a width b as measured in the direction from the longitudinal edge toward the center, which corresponds at least to the product of height h and a factor 0.1, and wherein the increase in thickness in the transition region occurs with a steady curvature, and wherein in the transition region the glass has a fire-polished surface.

Preferably, the glass film is formed so that the longitudinal edge is stepped on both sides, on the upper surface and on the lower surface, preferably even with mirror symmetry with respect to a mirror plane extending through the center of the glass film in parallel to the surfaces thereof, so that a double step is defined.

BRIEF DESCRIPTION OF THE DRAWINGS

FIG. 2 is a schematic sectional view through an edge region of a drawn glass film before the edge portion is removed.

FIG. 3 schematically illustrates the surface profile of a notch in a drawn glass film before the edge portion is removed.

FIG. 4 schematically illustrates the specially formed edge of a glass film obtained with the method of the invention.

DETAILED DESCRIPTION

Figure 1:
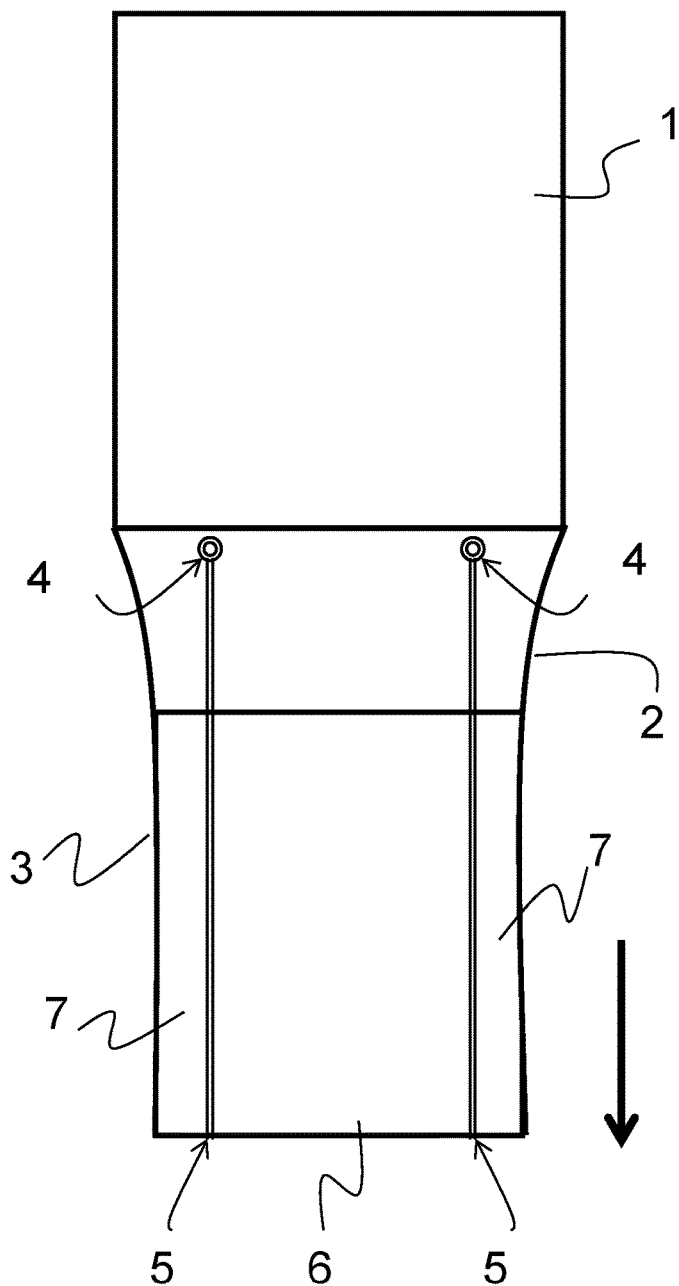
FIG. 1 schematically illustrates the method of the invention for producing a glass film with a specially formed edge.

FIG. 1 schematically illustrates an embodiment of the inventive method for producing a glass film with specially formed edge. On top, preform 1 can be seen which is heated in a portion 2 thereof in such a manner that a viscosity of less than $10^9$ dPa·s is obtained. Heating may be accomplished in a continuous furnace, by means of laser radiation or by others heating methods known in the art. The thus heated glass is withdrawn by a drawing mechanism (not shown) along the direction illustrated by an arrow, so that drawn glass 3 in the form of a glass film is produced, which is thinner and has a smaller width than preform 1. Moreover, in portion 2 the glass is additionally heated at least at one point 4. This heating is effected by means of a laser, preferably a $CO_2$ laser at a wavelength of 10.6 μm. The laser focus is located at the site indicated by point 4. The heating by means of the laser may be effected on a single surface or on both surfaces of the glass. Preferably, the laser impinges, as shown, at two points 4 so that a notch 5 is provided on both lateral sides of the drawn glass film 3, so that the drawn glass film 3 is divided, by the two notches 5, into a quality portion 6 and two edge portions 7.

Instead of the process of redrawing a glass film from a preform as schematically illustrated in FIG. 1, the glass film may be directly drawn from a melt as well, preferably in a down-draw process by withdrawing a melt from an elongated nozzle, or by an overflow fusion process, or may be obtained by a float process.

FIG. 2 schematically shows a sectional view through a portion of a drawn glass film 3. What is shown is a portion of quality portion 6 with two opposite faces 31, 33 and an edge portion 7 that comprises a thickened border 8. Quality portion 6 and edge portion 7 are separated by notch 5, and notch 5 is provided both in the upper surface and in the lower surface of drawn glass film 3. The transition from quality portion 6 and from edge portion 7 to notch 5 has the form of a step. Furthermore, a mirror plane 9 is indicated, that extends through the center of the glass film in parallel to the surfaces thereof, and the two notches 5 are formed with mirror symmetry thereto. In the context of the present specification, mirror symmetry means that the height of the step and the width of notches 5 formed into the upper and lower surfaces of the glass film do not differ by more than 10%.

FIG. 3 schematically shows the surface profile of a notch 5, with quality portion 6 adjoining notch 5 on the left and edge portion 7 on the right. The surface of groove 5 has a step-shaped profile characterized by the presence of a bottom 11 and a wall 12. Also shown is shoulder 13 of notch 5, wherein shoulder 13 refers to that region of the surface profile of the drawn glass film 3, which includes a transition from a higher region of drawn glass film 3 to wall 12. Shoulder 13, wall 12, and bottom 11 define a respective step 10, formed on both the left and the right side of notch 5, at the transition of quality portion 6 and edge portion 7 to notch 5. In the region of shoulders 13 the surface has a convex curvature, and at the transition from bottom 11 to wall 12 the surface has a concave curvature. The curvatures in the surface profile of drawn glass film 3, both in the region of shoulders 13 and at the transition from wall 12 to bottom 11 of notch 5 can be described by curvature or deformation radii r, for which, preferably, the following relationship is true: r≥2.5 μm.

FIG. 4 schematically illustrates the longitudinal edge 14 of a drawn glass film 3 obtained according to the invention, only the edge of quality portion 6 being illustrated herein, after edge portion 7 (not shown) has been broken off. The figure is not drawn to scale, for the sake of clarity. Longitudinal edge 14 has two steps 10, each one defined by a shoulder 13, a wall 12, and a bottom 11. Thus, the two steps 10 define a double step. Furthermore, longitudinal edge 14 has a fracture surface 15, where the edge portion 7 (not shown) was separated. Therefore, without being limited to the specific exemplary embodiment shown in FIG. 4, according to one embodiment of the invention the lateral end of the longitudinal edge of the glass film is in form of a fracture surface 15. The breaking of the glass film may be effected by score and break separation, for example, or by stress-crack separation. In the latter method, stresses are thermally induced in the glass, leading to controlled crack propagation along the longitudinal edge. For inducing stresses, a laser may again be used, by means of which the glass is heated along the desired separating line. Also indicated in the figure are the height h of step 10 and width b of the transition region. Here, the width b of the transition region extends from the longitudinal edge 14 of the drawn glass film 3 over the region where glass thickness is steadily increasing toward the center of the glass until the point where the nominal thickness of the glass is achieved, that means where glass thickness is in the range specified for quality portion 6. Considering the surface profile of step 10, the height h of step 10 corresponds to the difference between the level of quality portion 6 and the level of bottom 11 of step 10.

It is furthermore possible to optimize the lateral end of a longitudinal edge in subsequent processing steps, for example by fire-polishing using a flame or a laser, or by a plasma treatment, or by etching.

In the region of shoulder 13 the surface has a convex curvature in each case, whereas there is a concave curvature at each transition from bottom 11 to wall 12.

When the glass film is bent, for example when being coiled into a thin glass roll, a tensile stress will be produced along one of faces 31, 33, and a corresponding compressive stress at the opposite face. If defects such as microcracks exist in the surface, they may cause breakage of the glass film at a surface subjected to tensile stress. Particularly critical in this respect are the edges of a glass article, especially in case of sharp edges. However, such sharp edges are obtained in typical separation processes, such as in case of score and break separation. Although the fracture surface of the example shown in FIG. 4 also has such sharp edges, the tensile stresses occurring at this location will be considerably smaller than the tensile stress on face 31 or 33, since the height of fracture surface 15 is substantially smaller than the thickness of the glass film. The other regions of longitudinal edge 14, however, are fire-polished and gently curved, so that these regions will resist significantly higher tensile stresses. Thus, in summary, a longitudinal edge is obtained which exhibits particularly high mechanical resistance to bending stress.

LIST OF REFERENCE NUMERALS

1 Preform
2 Heated portion of the glass
3 Drawn glass film
4 Point of incidence of laser/laser focus
5 Notch
6 Quality portion
7 Border portion
8 Thickened border
9 Mirror plane
10 Step
11 Bottom
12 Wall
13 Shoulder
14 Longitudinal edge
15 Fracture surface
31, 33 Face
b Width of transition region
h Height of step

What is claimed is:

1. A method for producing a glass film having at least one stepped longitudinal edge, comprising the steps of:
   drawing a glass film having a heated portion with a viscosity of less than $10^9$ dPa·s so that a drawn glass film is thinner than the glass film; and
   heating the drawn glass film, via a laser, at least at one additional point, the at least one additional point being located in an edge region of the drawn glass film, wherein the drawn glass film has a viscosity at a site of laser focus of not more than $10^9$ dPa·s before the laser is switched on and wherein the heating is sufficient to form a notch at the at least one additional point, the notch being parallel to a drawing direction,
   wherein the notch has a convex curvature at a shoulder defined at a quality portion of the drawn glass film to a wall region of the notch and has a concave curvature defined at a transition from the wall region to a bottom of the notch.

2. The method as claimed in claim 1, wherein the glass film is a glass film preform, the method further comprising the step of heating a portion of the glass film preform so that the heated portion has the viscosity of less than $10^9$ dPa·s.

3. The method as claimed in claim 1, wherein the step of drawing the glass film comprises drawing the glass film directly from a glass melt.

4. The method as claimed in claim 3, wherein the step of drawing the glass film directly from the glass melt comprises a process selected from the group consisting of a down-draw process, an overflow fusion process, and a float process.

5. The method as claimed in claim 1, wherein the step of heating the drawn glass film, via the laser comprises heating at two points located at edge regions of the drawn glass film, wherein the heating is sufficient form two notches parallel to the drawing direction.

6. The method as claimed in claim 5, wherein the two notches are on both on an upper surface and a lower surface of the drawn glass film.

7. The method as claimed in claim 6, wherein the two notches are mirror symmetrical with respect to a mirror plane extending through a center of the drawn glass film in parallel to the upper and lower surfaces.

8. The method as claimed in claim 1, wherein the notch is step shaped.

9. The method as claimed in claim 1, wherein the quality portion is that region in which the drawn glass film has the intended thickness with a maximum deviation of ±20%.

10. The method as claimed in claim 9, wherein the intended thickness is at least twice the height of the notch.

11. The method as claimed in claim 9, wherein the intended thickness is less than 2000 µm.

12. The method as claimed in claim 1, wherein the notch has an overall width of not more than 20 mm.

13. The method as claimed in claim 1, further comprising selecting the laser with a power sufficient so that in a region of focus of the laser the viscosity averaged across the thickness is between $10^4$ and $10^9$ dPa·s.

14. The method as claimed in claim 13, wherein the laser has a power in a range from 5 to 100 W.

15. The method as claimed in claim 1, wherein the glass film comprises a glass selected from the group consisting of silicate glass, alkali silicate glass, alkali alkaline earth silicate glass, soda-lime glass, mixed-alkali lime silicate glass, boron silicate glass, phosphate silicate glass, boron phosphate silicate glass, aluminum silicate glass, alkali aluminum silicate glass, alkali alkaline earth aluminum silicate glass, boron aluminum silicate glass, and boron phosphate aluminum silicate glass.

16. The method as claimed in claim 1, further comprising:
   cooling the drawn glass film; and
   separating the drawn glass film along the notch after the cooling.

17. The method as claimed in claim 1, wherein the convex curvature has a radius that is ≥2.5 µm.

18. The method as claimed in claim 1, wherein the concave curvature has a radius that is ≥2.5 µm.

\* \* \* \* \*